United States Patent [19]

Goodson et al.

[11] Patent Number: 4,854,981
[45] Date of Patent: Aug. 8, 1989

[54] IRON OXIDE CATALYST AND METHOD FOR MAKING SAME

[75] Inventors: Forrest R. Goodson; Mark E. Dudley, both of San Jose; Thomas P. Rudy, Saratoga, all of Calif.

[73] Assignee: United Technologies Corporation, Hartford, Conn.

[21] Appl. No.: 44,096

[22] Filed: Apr. 30, 1987

[51] Int. Cl.$^4$ .......................................... C06B 45/00
[52] U.S. Cl. ........................................ 149/2; 149/20; 149/21; 149/76; 149/109.6; 149/110; 423/632; 502/325
[58] Field of Search ...................... 502/325; 149/2, 20, 149/21, 109.6, 110, 76; 423/632

[56] References Cited

U.S. PATENT DOCUMENTS

| | | | |
|---|---|---|---|
| 3,677,839 | 7/1972 | Sayles | 149/19 |
| 3,932,242 | 1/1976 | Bartley et al. | 149/19.9 |
| 4,003,850 | 1/1977 | Callighan et al. | 502/336 |
| 4,006,090 | 2/1977 | Beck | 423/632 |
| 4,023,994 | 5/1977 | Arendale | 149/19.2 |
| 4,120,709 | 10/1978 | Hamner et al. | 149/19.92 |
| 4,424,085 | 1/1984 | Fukuma et al. | 149/19.1 |
| 4,608,239 | 8/1986 | Devon | 423/210 |

OTHER PUBLICATIONS

"Preparation of Highly Dispersed Ferric Oxide Powder of Uniform Particle Size by the Carbonyl Method" by Syrkin and Plushkina, Soviet Powder Metallurgy & Metal Ceramics, vol. 7, #4 (1967), pp. 1–7.

"Transparent Purple Iron Oxide from the Combustion of Iron Carbonyl" by Ostertag et al., Defacet 33, No. 12–1979.

"Preparation in Hydrogen–Oxygen Flame of Ultrafine Metal Oxide Particles" by Formenti et al., Journal of Colloid and Interface Science, vol. 39, No. 1, Apr. 1972.

"Reactions of Ni(CO)$_3$ and the Heterogeneous Oxidation of Ni(CO)$_4$ and Fe(CO)$_5$" by Callear, Proc. Roy. Soc. A., vol. 265, 88–96 (1961).

"Flame Synthesis of Fine Particles" by Gael D. Ulrich, Aug. 6, 1984, C&EN, pp. 22–29.

"Particle Growth in Flames-III. Coalescence as a Rate-Controlling Process", G. D. Ulrich & N. S. Subramanian, Combustion Science & Technology, 1977, vol. 17.

"Theory of Particle Formation & Growth in Oxide Synthesis Flames" G. D. Ulrich, Combustion Science & Technology, 1971, vol. 4, pp. 45–57.

"Aggregation & Growth of Submicron Oxide Particles in Flames", G. D. Ulrich, Journal of Colloid & Interface Science, vol. 87, No. 1, May 1982, pp. 257–265.

Chart-Mapico Iron Oxides (Cities Service, Columbian Division Citco), pp. 119–126.

Primary Examiner—Stephen J. Lechert, Jr.

[57] ABSTRACT

A highly active, finely divided ferric oxide burning rate catalyst and method for making the same. The catalyst is made by vaporizing an iron-containing compound that is capable of vaporization at a temperature below about 500° C., and is capable of forming ferric oxide when reacted with an oxygen-containing atmosphere at temperatures below about 500° C. The iron-containing compound is then oxidized in an oxygen-containing atmosphere. The ferric oxide burning rate catalyst made by this process is particularly adapted for use in a composite solid rocket propellant. This process provides an ultra pure, highly active, finely divided burning rate catalyst.

16 Claims, 5 Drawing Sheets

IRON OXIDE CATALYST AND METHOD FOR MAKING SAME

TECHNICAL FIELD

This invention relates to a composite solid propellant and method for making the same.

BACKGROUND ART

In the field of composite solid propellants for various rocket motors, a continuing desire is to increase the burning rate. An increase in the burning rate of a solid propellant leads to an increase in the mass flux of combustion gases, hence an increase in thrust. Accordingly, it becomes possible to increase the launching velocity of the rocket or, when there is no need of increasing the launching velocity, to reduce the burning surface area. In the latter case, the loading efficiency (mass fraction of propellant) may be increased. Thus, solid propellants of increased burning rates are the basis of solid propellant rocket motors of relatively small size but relatively high thrust and will certainly contribute to broadening of the applicability of end-burning rocket motors.

Typically, the burning rate of a composite solid propellant is increased with minimum effect on other properties by using an additive that catalyzes the reaction between the oxidizer and the binder (fuel) in the propellant. Until now, various metal oxide powders have been proposed as the burning rate increasing additive or catalyst, but most of them have proved to be impractical because they promote degradation of conventional rubber binders. The most useful binders contain a substantial concentration of polybutadiene, an unsaturated hydrocarbon that provides elasticity. The olefinic unsaturation is very vulnerable to attack by atmospheric oxygen, particularly when catalyzed by traces of most elements of the first transition series of the periodic chart. Thus, propellants formulated with oxides of these metallic elements suffer hardening and embrittlement in storage and become unfit for use.

The most practical choice among the hitherto proposed metal oxide catalysts has been ferric oxide, either hydrous (FeOOH) as described in U.S. Pat. No. 4,424,085; Anchor FY-842 TM FeOOH (Toho Ganryo Kogyo Co. Ltd.); and Mapico Yellow 300 TM FeOOH (Cities Service Co., Columbian Division Citgo) or anhydrous ($Fe_2O_3$). The major limitation of ferric oxide is that the catalytic efficiency diminishes rapidly as its concentration is increased. Moreover, acceptable rheology of the uncured propellant and tensile properties after cure impose a strict upper limit on the allowable concentration of solid ingredients. Hence, ferric oxide, which provides a negligible contribution to impulse, must be added at the expense of ballistically valuable solid ingredients, typically ammonium perchlorate oxidizer or powdered aluminum fuel.

To circumvent the aforementioned solids loading limitation, it has been proposed to use liquid organoiron compounds (e.g., alkylferrocene derivatives) (see U.S. Pat. No. 4,120,709) as catalysts for increasing burning rate. These substances offer acceptable fuel value and may be substituted for a fraction of the organic binder. Thus, they may be used at relatively high concentration with relatively little degradation of rheology, tensile properties or delivered impulse. Unfortunately, these catalysts suffer several important limitations. They greatly depress the autoignition temperature of a propellant and thereby increase the hazard of accidental ignition by friction, impact, or any other source of heat. They also migrate readily from the propellant into inert organic substrates such as liners and insulators. Finally, they can impair aging stability at elevated temperature in air. In addition, they are relatively expensive.

Accordingly, there has been a constant search in this field of art for propellant catalysts having improved properties.

DISCLOSURE OF INVENTION

This invention is directed to a ferric oxide burning rate catalyst that has a particle size less than 100 angstroms (Å) and exhibits improved activity. The catalyst comprises ferric oxide.

Another aspect of this invention relates to a composite solid rocket propellant having an increased burning rate. The propellant comprises ferric oxide having a particle size less than about 100 Å.

Yet another aspect relates to a method of making a ferric oxide burning rate catalyst that results in a highly active, finely divided burning rate catalyst. The method comprises vaporizing an iron-containing compound that is capable of vaporization at a temperature below about 500° C., and is capable of forming ferric oxide when reacted with an oxygen-containing atmosphere at temperatures below about 500° C. The iron-containing compound is then oxidized in an oxygen-containing environment.

Another aspect of this invention is a ferric oxide burning rate catalyst made by this process.

Yet another aspect of this invention is a rocket composite solid propellant comprising a ferric oxide burning rate catalyst made by this process.

These processes and catalysts make a significant advance in the field of burning rate catalysts for solid rocket motors. This process provides an ultra pure, highly active, finely divided burning rate catalyst.

The foregoing and other objects, features and advantages will be apparent from the specification, claims and from the accompanying drawings which will illustrate an embodiment of the invention.

BEST MODE FOR CARRYING OUT THE INVENTION

Figure 1:
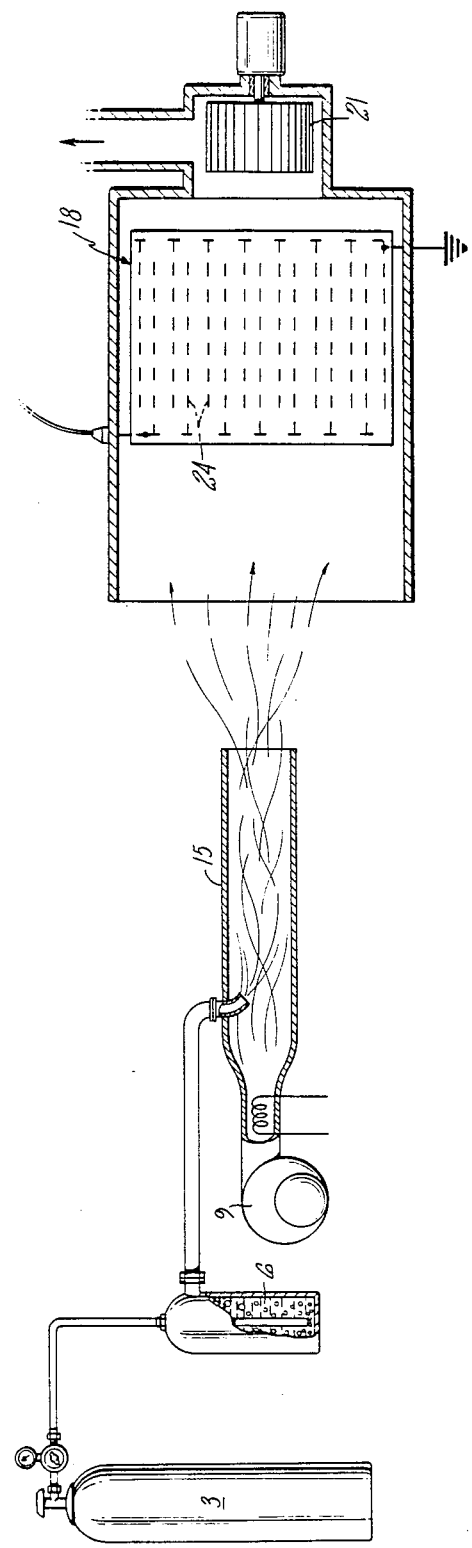
FIG. 1 schematically illustrates the method of making the iron oxide catalyst according to this invention.

Generally, any iron-containing compound that is capable of being vaporized without significant decomposition at a temperature below about 500° C. and is capable of reacting at temperatures below about 500° C. with an oxygen-containing atmosphere to form ferric oxide as the exclusive solid product (e.g., susceptible to oxidation) may be used in this invention. It is important that the compound be capable of being vaporized without decomposition at a temperature below about 500° C.

because the most finely divided (e.g., smallest particle size) product is obtained only if the iron atoms in the starting material are spatially widely separated. If they are closely associated, as in a condensed (i.e., solid or liquid) compound, the particles of the product of oxidation will contain many iron atoms (i.e., the iron oxide particles will be relatively large). It is important that the compound be capable of reacting at temperatures below about 500° C. with an oxygen-containing atmosphere to form ferric oxide as the exclusive solid product because unconverted starting material or solid products other than ferric oxide are likely to be inferior burning rate catalysts and to exert harmful effects on propellant properties other than burning rate (e.g., shortened pot life and impaired aging stability). At temperatures above 500° C. agglomeration and sintering of the oxidation product will occur with loss of specific surface area resulting in reduced catalytic activity.

It is also preferred that the iron-containing compound have a high iron content to increase the yield of the desired iron oxide product. Finally, it is preferred that the iron-containing compound be essentially free of any impurities that will not be burned to form harmless gases in the combustion step. In particular, impurities containing metals other than iron are usually very undesirable.

It is especially preferred to employ compounds containing only the elements carbon, hydrogen, nitrogen and oxygen in addition to iron. The presence of halogens, sulfur, phosphorous and boron is undesirable because it interferes with the complete conversion to the oxide. In addition, phosphorous, boron and sulfur can form a glassy product or undesired solid residue that coats the iron oxide.

Preferred generic classes of iron-containing compounds are carbonyls, chelates of beta diketones, complex cyanides and ferrocene derivatives. These are preferred because they contain adequate concentrations of iron, exhibit the required volatility and thermal stability, and oxidize readily at elevated temperatures to form as a solid product only ferric oxide. Exemplary compounds include ferric acetylacetonate, ferrous ferrocyanide and ferrocenes (e.g., lower alkyl).

It is especially preferred that iron pentacarbonyl (available from Pressure Chemical Co., Pittsburgh, Pa.) be used because of its high volatility, low melting point, high iron content and stability in the dark at temperatures well above its boiling point. Finally, it produces a superior catalyst.

Typically an inert carrier gas (e.g., nitrogen) is used to transfer the vapor of an iron containing starting material such as iron pentacarbonyl to the oxidation site.

Oxidation of the iron compound requires an oxygen-containing gas (e.g., air). Preferably, it is essentially free of any impurities that will not be burned to form harmless gases in the oxidation step. Generally, the oxygen must be present in at least about 10% by volume in order to ensure complete and prompt oxidation.

The catalysts of this invention may be made by the vaporization of the above-described iron containing compounds in the oxygen environment (typically carried by an incombustible carrier gas). The iron compound is then oxidized. It is preferred that iron pentacarbonyl be oxidized at a temperature between about 157° C. and 1371° C. Below about 157° C., insignificant (if any) quantities of $Fe_2O_3$ are formed. Above about 1371° C., the temperature is such as to significantly raise the particle size. It is especially preferred that iron pentacarbonyl be oxidized at a temperature between about 204° C. and about 500° C. Below about 204° C., the yield of $Fe_2O_3$ is low (e.g., below about 10%) and above about 500° C., the crystals start to anneal with a resultant increase in particle size, consequent loss of crystal surface area and thus loss of catalytic surface area. It may be desirable to heat the oxidation product subsequent the above described oxidation.

According to FIG. 1, for those iron-containing compounds that are liquids at the vaporization temperature, the incombustible carrier gas 3 may be bubbled through the iron containing liquid 6 and the resultant vapor/carrier mixture combined with heated air from a blower 9 and fed to oxidation duct work 15 where it is spontaneously oxidized. The oxidation products are drawn through an electrostatic precipitator 18 by a squirrel cage blower 21. A suitable electrostatic precipitator is an Emerson Electronic Air Cleaner, Model 14C22M-41000 (available from White-Rodgers, Inc., Electro-Air Division, Harrison, Ark.). A suitable squirrel cage blower is a Dayton 525 cfm Blower-AOL, Model 4C3445-A (available from W. W. Grainger, Inc., Chicago, Ill.). The resulting catalysts may then be collected by scraping or simply shaking the electrodes 24 of the precipitator.

Those iron-containing compounds that are solids at the vaporization temperature may be vaporized into the carrier gas by directing a stream of the latter over the surface of the solid compound and continuing as described above with oxidation, precipitation and collection. It is preferable that the vapor pressure of the solid compound be greater than about 0.005 atmospheres. This enables the collection of adequate quantities of catalyst. It is especially preferred that the vapor pressure be greater than about 0.01 atmospheres to provide a conveniently high rate of production of catalyst. These vapor pressures can be achieved by raising the temperature of the vaporizing compound.

Figure 2:
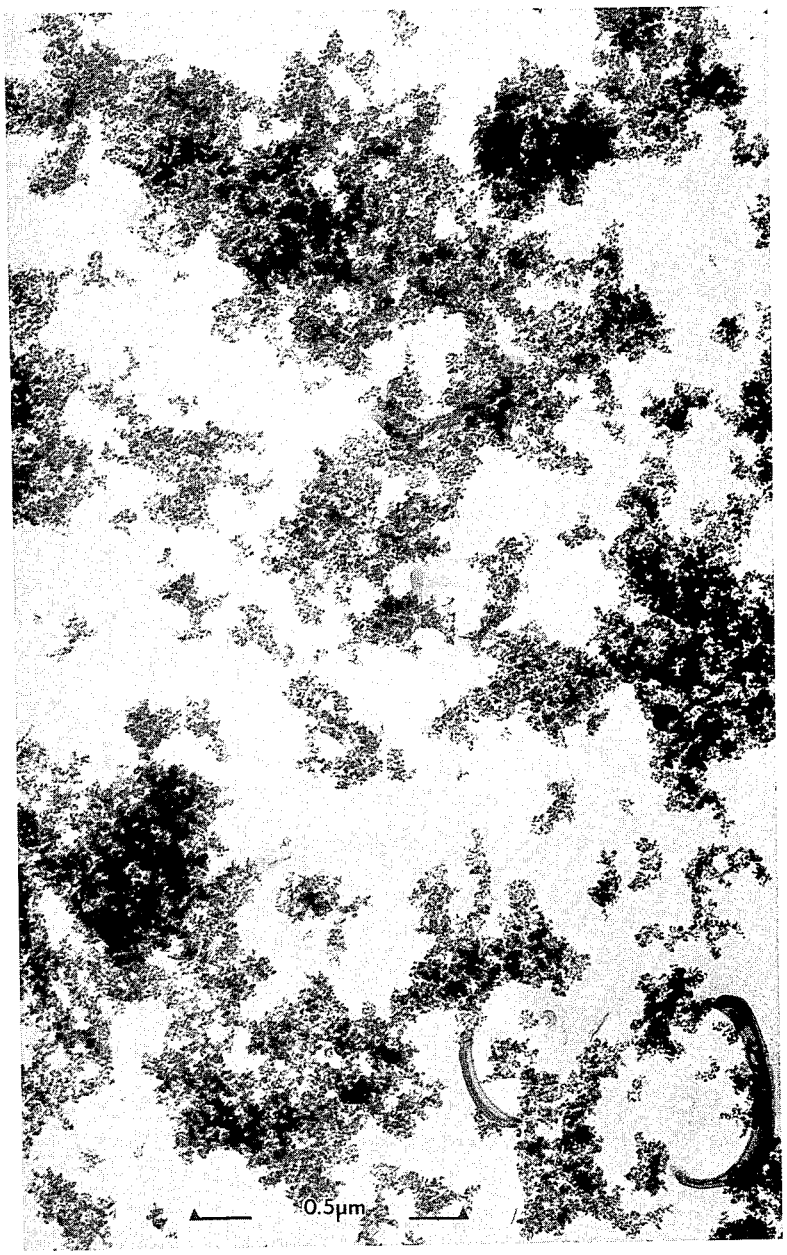
FIG. 2 is a transmission electron micrograph of the ferric oxide particles of this invention.

The product of these processes is a very finely divided, highly catalytically active, anhydrous oxide. A number of characteristics are believed to contribute to its high activity. The most important is its enormous surface area provided by average particle diameters that are less than about 100 Å and even 50 Å. They typically have globular shapes that provide improved processibility. Generally, the average calculated specific surface area is greater than about 100 m$^2$/g. FIG. 2 depicts a transmission electron micrograph of the ferric oxide catalyst of this invention. In the figure, the particles are less than about 100 Å in size.

Figure 3:
FIGS. 3 and 4 are transmission electron micrographs of Mapico Yellow 300 TM FeOOH and Anchor FY-842 TM FeOOH respectively.
Figure 4:

In contrast, FIG. 3 depicts a transmission electron micrograph of Mapico Yellow 300 FeOOH. The particles are rod shaped and typically about 3500 Å long by about 250 Å diameter. Their average calculated surface area is believed to be about 30 m$^2$/g. FIG. 4 depicts a transmission electron micrograph of Anchor FY-842 FeOOH. The particles again are rod shaped and typically about 10,000 Å long by about 750 Å diameter. The average calculated specific surface area is typically about 10 m$^2$/g. Generally, both of these particles are substantially axisymmetric. Their articular shapes make processibility (rheology) difficult.

A second characteristic of the catalysts of this invention is the chemical composition of the novel catalyst, substantially pure ferric oxide. It is stable at flame temperatures and therefore is believed to be the form responsible for catalysis of combustion. It is believed that other forms of iron or iron oxide (for example, hydrated ferric oxide, FeOOH) must be converted to ferric oxide before they become active. This delays catalysis and thereby diminishes catalytic efficiency. In the case of certain iron-containing catalysts, including hydrated ferric oxide, FeOOH, the yield of active ferric oxide in the flame is less than the amount of precursor added to the propellant formulation.

Third, the surface microstructure of the novel catalyst is believed to be especially active. The active sites on solid, inorganic oxidation catalysts are believed to be characterized by defects in the crystal lattice that promote the desired adsorption of reagents and desorption of products in the catalyzed process. The catalyst of this invention is believed to possess at the outset an active surface microstructure that must be acquired in a flame of burning propellant by other catalysts.

Finally, the novel catalyst is free of the undesirable impurities (e.g., halides and sulfates) that are typically adsorbed upon iron oxides that are conventionally prepared in aqueous solution inherently containing high concentrations of foreign ions. Such impurities are often responsible for acceleration of cure (short pot life of uncured propellant) and for accelerated oxidative degradation of olefinically unsaturated binders (e.g., polybutadiene). In contrast, this process eliminates the solutions and thus the impurities. Also, the hydrated ferric oxide catalysts must be rigorously dried to remove tenacious adsorbed moisture that interferes with the cure of the propellant by reacting destructively with curing agents (e.g., isocyanates).

Typically, the above catalysts are used as a burning rate accelerator for an ammonium perchlorate based rocket propellant. However, it is also believed that propellants based on other perchlorates (e.g. potassium perchlorate) would be enhanced with the use of the above catalyst. Typically, a variety of other conventional components and additives are compounded (added) in conventional amounts to facilitate use as a rocket propellant. An exemplary list of additives include fuel binders, curing agents, plasticizers, adhesion-increasing agents (i.e., bonding agents) antioxidants, powdered metal fuels, and combustion stabilizers.

EXAMPLE

A stream of nitrogen gas was passed at a rate of liter per minute for 345 minutes through a gas washing bottle fitted with a dip tube that ended above the surface of 56 grams of liquid iron pentacarbonyl at room temperature. The resulting gaseous mixture was fed to an oxidation duct work where it spontaneously oxidized. The oxidation products were drawn through an electrostatic precipitator (available from White-Rodgers, Inc., Electro-Air Division, Harrison, Ark.) by a squirrel cage blower (available from W. W. Grainger, Chicago, Ill.). The oxidation occurred at approximately 371° C. The oxidation was allowed to occur for 345 minutes at which time sufficient product had accumulated on the precipitator. The flow of nitrogen gas/iron pentacarbonyl was then stopped, the power to the precipitator was turned off, and 11.6 grams of ferric oxide was removed by scraping from the precipitator plates.

Six ammonium perchlorate based propellants were similarly compounded. However, five substituted 0.10 weight percent (%) ferric oxide for an equal % of bonding agent (labeled D, E, F, H and J). The above six propellants were static tested at various pressures in small rocket motors with the following grain dimensions:

Outer diameter—5.08 cm (2 inches)
Inner diameter—3.81 cm (1.5 inch)
Length—9.525 cm (3.75 inches)
Web—0.635 cm (0.25 inch)
Burning area—132 cm2 (20.4 square inches)
Mass—145 grams (0.32 pounds)

Figure 5:
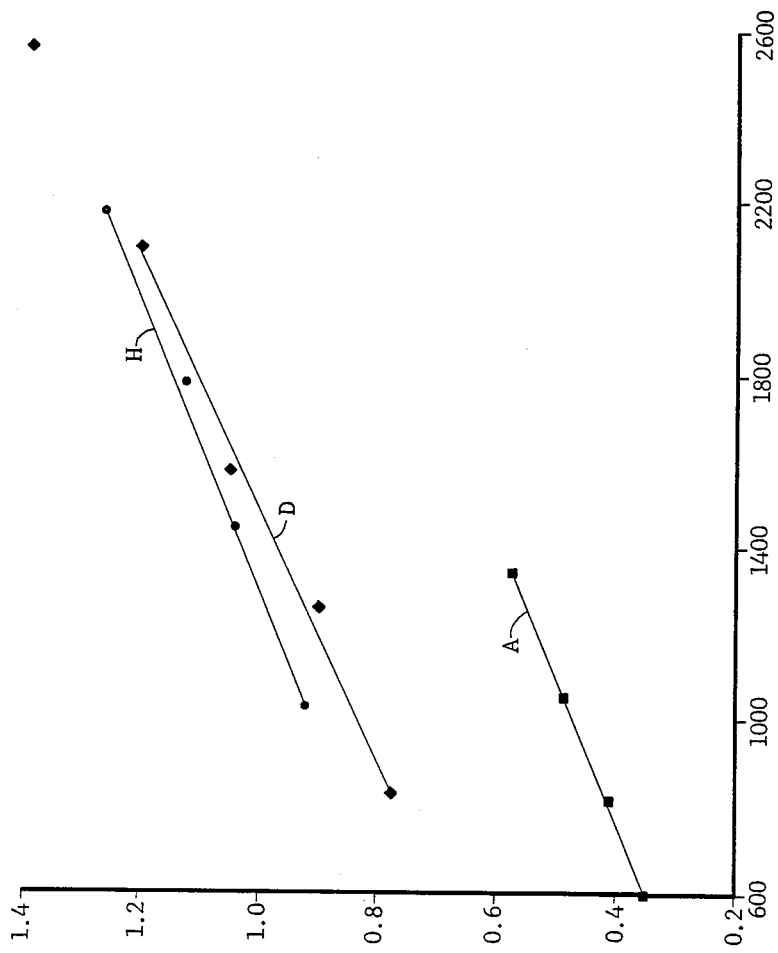
FIG. 5 graphically depicts the relation of burning rate to pressure for a control propellant, the same formulation to which a catalyst of this invention has been added, and the same formulation to which a conventional iron oxide catalyst has been added.

The results of the motor tests are depicted in the following table and in FIG. 5. FIG. 5 illustrates that the pyrogenic iron oxide catalyst (H) of the present invention is substantially more effective than Mapico Yellow 300 (D) in elevating the burning rate of the control formulation (A). The burn rate in inches per second (in/sec) is graphed against pressure in pounds per square inch (psi). The catalyst of this invention provides not only a high burning rate but also a desirably low pressure exponent.

| Sample No. | Catalyst 0.10% Weight | Pressure Pounds Per Square Inch | Burn Rate Inch/Second | Calculated $r_{1000}[1]/n^2$ |
|---|---|---|---|---|
| A | None (Control) | 600 | 0.352 | 0.47/0.62 |
|   |   | 828 | 0.412 |   |
|   |   | 1053 | 0.484 |   |
|   |   | 1341 | 0.571 |   |
| D | Mapico Yellow 300 FeOOH | 836 | 0.774 | 0.82/0.54 |
|   |   | 1256 | 0.896 |   |
|   |   | 1567 | 1.046 |   |
|   |   | 2082 | 1.196 |   |
|   |   | 2557 | 1.381 |   |
| E | Mapico 516M $Fe_2O_3$ | 1171 | 0.781 | 0.68/0.67 |
|   |   | 1567 | 0.883 |   |
|   |   | 2183 | 1.126 |   |
|   |   | 2802 | 1.366 |   |
| F | Anchor FY-842 FeOOH | 450 | 0.455 | 0.69/0.62 |
|   |   | 1032 | 0.676 |   |
|   |   | 1470 | 0.865 |   |
|   |   | 2486 | 1.238 |   |
| H | Superfine Iron Oxide $Fe_2O_3$ | 1029 | 0.92 | 0.90/0.42 |
|   |   | 1435 | 1.04 |   |
|   |   | 1774 | 1.12 |   |
|   |   | 2161 | 1.26 |   |
| J | Catocene $Fe_2C_{27}H_{32}$ | 650 | 0.65 | 0.74/0.48 |
|   |   | 950 | 0.71 |   |
|   |   | 1250 | 0.8 |   |
|   |   | 1600 | 0.9 |   |
|   |   | 2050 | 1.03 |   |
|   |   | 2800 | 1.25 |   |

[1] Burning Rate at 1000 psi
[2] Pressure Exponent

Although this invention has been described in terms of the production of a ferric oxide catalyst for use in rocket propellants, the ferric oxide may also be used advantageously in other gas-phase oxidation processes requiring a solid, refractory catalyst of high surface area.

This invention provides a convenient process for producing a rocket propellant burning rate catalyst that has excellent catalytic activity. Specifically, the process results in a very finely divided ferric oxide that produces a high burning rate and a low pressure exponent.

It should be understood that the invention is not limited to the particular embodiment shown and described herein, but that various changes and modifications may be made without departing from the spirit or scope of this concept as defined by the following claims.

We claim:

1. A ferric oxide burning rate catalyst comprising ferric oxide particles having an average particle size less than about 100 Å.

2. A composite solid rocket propellant comprising ferric oxide particles having an average particle size less than about 100 Å.

3. A method for making a ferric oxide burning rate enhancing catalyst particularly adapted for use in a rocket propellant comprising:
   (a) vaporizing an iron-containing compound that
      (i) is capable of being vaporized below about 500° C.; and
      (ii) is capable of forming ferric oxide when reacted with an oxygen-containing atmosphere at temperatures below about 500° C.; and
   (b) oxidizing said vaporized iron-containing compound in an oxygen environment wherein ferric oxide particles are formed, suspended in the oxygen environment;
whereby the ferric oxide catalyst particle size is less than 100A resulting in improved activity.

4. A method as recited in claim 3 wherein the iron-containing compound is carbonyls, chelates of beta diketones, complex cyanides or ferrocene derivatives.

5. The method as recited in claim 3 wherein the iron containing compound is iron pentacarbonyl.

6. The method as recited in claim 5 wherein said iron pentacarbonyl is oxidized at a temperature between about 157° C. and about 1371° C.

7. The method as recited in claim 5 wherein said iron pentacarbonyl is oxidized at a temperature between about 204° C. and 500° C.

8. A ferric oxide burning rate catalyst made by the process of claim 3.

9. A composite solid rocket propellant comprising ferric oxide made by the process of claim 3.

10. The catalyst as recited in claim 1 wherein the particle size is less than about 50A.

11. The rocket propellant as recited in claim 2 wherein the particle size is less than about 50A.

12. The method as recited in claim 3 wherein the ferric oxide catalyst particle size is less than about 50A.

13. The method as recited in claim 12 wherein said iron containing compound is iron pentacarbonyl.

14. The method as recited in claim 13 wherein sand iron pentacarbonyl is oxidized at a temperature between about 204° C. and about 500° C.

15. The ferric oxide burning rate catalyst made by the process of claim 14.

16. A composite solid rocket propellant comprising ferric oxide made by the process of claim 14.

* * * * *